(12) United States Patent
Higashide

(10) Patent No.: US 11,415,196 B2
(45) Date of Patent: Aug. 16, 2022

(54) ROLLER CHAIN

(71) Applicant: DAIDO KOGYO CO., LTD., Ishikawa (JP)

(72) Inventor: Naohiro Higashide, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 316 days.

(21) Appl. No.: 16/898,919

(22) Filed: Jun. 11, 2020

(65) Prior Publication Data

US 2020/0300338 A1 Sep. 24, 2020

Related U.S. Application Data

(63) Continuation of application No. PCT/JP2018/043583, filed on Nov. 27, 2018.

(30) Foreign Application Priority Data

Dec. 18, 2017 (JP) .............................. JP2017-242188

(51) Int. Cl.
*F16G 13/07* (2006.01)

(52) U.S. Cl.
CPC .......... *F16G 13/07* (2013.01); *F16C 2326/58* (2013.01)

(58) Field of Classification Search
CPC . F16G 13/06; Y10T 29/49702; F16N 2210/33
USPC .................................. 474/91, 226, 230, 231
See application file for complete search history.

(56) References Cited

U.S. PATENT DOCUMENTS

| 3,153,348 | A | * | 10/1964 | Kuntzmann | ............. | C25D 7/10 |
| | | | | | | 474/213 |
| 3,336,089 | A | * | 8/1967 | Krickler | ................... | F16C 11/04 |
| | | | | | | 384/396 |
| 3,811,334 | A | * | 5/1974 | Kuenzig | ................. | F16G 13/06 |
| | | | | | | 474/231 |
| 4,424,050 | A | * | 1/1984 | Sato | ........................ | F16G 13/06 |
| | | | | | | 474/231 |
| 4,464,151 | A | * | 8/1984 | Kahl | ....................... | F16G 13/06 |
| | | | | | | 474/228 |
| 4,571,228 | A | * | 2/1986 | Tracy | ...................... | F16G 13/06 |
| | | | | | | 384/279 |

(Continued)

FOREIGN PATENT DOCUMENTS

DE 20 2014 003 948 9/2015
JP 62-202561 12/1987

(Continued)

OTHER PUBLICATIONS

International Search Report dated Feb. 26, 2019 in International (PCT) Application No. PCT/JP2018/043583.

*Primary Examiner* — Henry Y Liu
(74) *Attorney, Agent, or Firm* — Wenderoth, Lind & Ponack, L.L.P.

(57) ABSTRACT

A roller chain includes an inner link and an outer link. A bush is projected out of an outer side surface of an inner plate by a predetermined amount and an end surface of a bush being projected is brought into contact with an inner side surface of the outer plate to form a predetermined gap between the outer side surface of the inner plate and the inner side surface of the outer plate. The predetermined gap is within a range of 7 to 18[%] of the distance between the inner side surfaces of the pair of outer plates.

4 Claims, 6 Drawing Sheets

(56) References Cited

U.S. PATENT DOCUMENTS

| | | | | | |
|---|---|---|---|---|---|
| 4,615,171 | A * | 10/1986 | Burk | ............... | F16G 13/06 59/4 |
| 5,269,729 | A * | 12/1993 | Thuerman | ............... | F16G 13/06 474/207 |
| 5,412,934 | A * | 5/1995 | Furuyama | ............... | F16G 13/06 474/206 |
| 5,425,679 | A * | 6/1995 | Utz | ............... | F16H 57/04 277/399 |
| 5,809,767 | A * | 9/1998 | Tanaka | ............... | F16G 13/06 59/5 |
| 5,857,318 | A * | 1/1999 | Odai | ............... | F16G 13/06 384/291 |
| 5,879,257 | A * | 3/1999 | Tanaka | ............... | F16G 13/06 474/209 |
| 5,921,880 | A * | 7/1999 | Ishimoto | ............... | F16G 13/06 474/212 |
| 5,943,855 | A * | 8/1999 | Morimoto | ............... | F16G 13/06 59/5 |
| 6,393,818 | B1 * | 5/2002 | Nakagawa | ............... | B23P 15/00 384/291 |
| 6,855,081 | B2 * | 2/2005 | Koschig | ............... | F16G 13/06 148/330 |
| 6,938,732 | B2 * | 9/2005 | Garbagnati | ............... | F16G 13/06 59/5 |
| 7,775,925 | B2 * | 8/2010 | Nakagawa | ............... | F16G 13/06 474/91 |
| 7,914,409 | B2 * | 3/2011 | Aoki | ............... | F16G 13/06 474/215 |
| 8,011,497 | B2 * | 9/2011 | Ono | ............... | F16G 13/06 198/852 |
| 8,066,604 | B2 * | 11/2011 | Righi | ............... | F16G 13/06 474/228 |
| 8,136,339 | B2 * | 3/2012 | Kondo | ............... | F16C 33/104 384/531 |
| 2002/0010047 | A1 * | 1/2002 | Kurokawa | ............... | F16G 13/06 474/207 |
| 2002/0165057 | A1 * | 11/2002 | Barton | ............... | F16G 13/06 474/228 |
| 2003/0032511 | A1 * | 2/2003 | Kanehira | ............... | F16G 13/06 474/209 |
| 2003/0121248 | A1 * | 7/2003 | Nakagawa | ............... | F16G 13/06 59/4 |
| 2005/0049098 | A1 * | 3/2005 | Butterfield | ............... | F16G 13/04 474/212 |
| 2007/0155563 | A1 * | 7/2007 | Aoki | ............... | F16G 13/06 474/206 |
| 2008/0076613 | A1 * | 3/2008 | Nakagawa | ............... | F16G 13/06 474/231 |
| 2008/0161147 | A1 * | 7/2008 | Nakagawa | ............... | F16G 13/06 474/207 |
| 2008/0287237 | A1 * | 11/2008 | Aoki | ............... | F16G 13/06 474/228 |
| 2009/0286642 | A1 * | 11/2009 | Takagishi | ............... | F16G 13/06 474/231 |
| 2010/0081528 | A1 * | 4/2010 | Yamane | ............... | B65G 45/08 474/91 |
| 2010/0167858 | A1 * | 7/2010 | Baba | ............... | F16G 13/18 474/231 |
| 2010/0285912 | A1 * | 11/2010 | Aoki | ............... | F16G 13/06 474/228 |
| 2011/0251005 | A1 * | 10/2011 | Ragnitz | ............... | F16G 13/06 474/231 |
| 2011/0263368 | A1 * | 10/2011 | Fujiwara | ............... | F16J 15/3456 474/206 |
| 2012/0302385 | A1 * | 11/2012 | Pawlicki | ............... | B21L 9/04 474/231 |
| 2013/0053194 | A1 * | 2/2013 | Yokoyama | ............... | F16G 13/06 474/91 |
| 2014/0216901 | A1 * | 8/2014 | Huang | ............... | B65G 17/38 198/851 |
| 2014/0357440 | A1 * | 12/2014 | Yokoyama | ............... | F16G 13/06 474/231 |
| 2017/0211660 | A1 * | 7/2017 | Yasu | ............... | F16G 15/06 |
| 2018/0031075 | A1 * | 2/2018 | Tanaka | ............... | B21L 9/065 |
| 2018/0283496 | A1 * | 10/2018 | Asada | ............... | B21L 9/08 |

FOREIGN PATENT DOCUMENTS

| | | |
|---|---|---|
| JP | 2-55605 | 4/1990 |
| JP | 8-4987 | 1/1996 |
| JP | 10-238598 | 9/1998 |
| JP | 2008-190547 | 8/2008 |
| JP | 2013-127300 | 6/2013 |
| JP | 5824259 | 11/2015 |
| WO | 2007/029336 | 3/2007 |

* cited by examiner

ROLLER CHAIN

CROSS-REFERENCE TO RELATED APPLICATIONS

This application is a Continuation of International Patent Application No. PCT/JP2018/43583, filed Nov. 27, 2018, which claims the benefit of Japanese Patent Application No. 2017-242188, filed Dec. 18, 2017, both of which are hereby incorporated by reference herein in their entirety.

BACKGROUND OF THE INVENTION

Field of the Invention

The present invention relates to a conveyance or a power transmission roller chain and more specifically to a roller chain having no seal. Note that the roller chain is not limited to be a roller chain in a narrow sense in which a roller is fitted around a bush, and a so-called bush chain from which a roller is omitted is included in the roller chain in the present invention.

Description of the Related Art

In general, a roller chain 1 is constructed by endlessly linking an inner link 6 in which both end portions of a pair of inner plates 2, 2 are linked by a bush 3 and in which a roller 5 is fitted around the bush 3 with an outer link 10 in which both end portions of two outer plates 7, 7 are linked by a pin 9 by fitting the pin 9 through the bush 3 as illustrated in FIG. 6. While the roller chain 1 travels while engaging with a sprocket, the roller chain 1 flexes as the bush 3 slides with the pin 9 in engaging with the sprocket. Therefore, it is necessary to supply lubricant oil between the bush 3 and the pin 9 composing a bearing portion 11 in the roller chain 1.

If a distance between inner side surfaces of the pair of outer plates 7 is denoted as C and a distance between outer side surfaces of the pair of inner plates 2 is denoted as D in the abovementioned prior art roller chain 1, the bush 3 is fixed to the inner plates 2 such that end surfaces of the bush 3 are in flush with the outer side surfaces of the inner plates 2. Therefore, the inner plates 3 face the outer plates 7 with a slight gap A of [(C−D)/2]. Therefore, while the lubricant oil is supplied to the gap A to lead to the bearing portion 11, there is a case where an enough amount of lubricant oil cannot be supplied to the bearing portion because the gap A is narrow, possibly causing wear elongation of the chain.

Conventionally, there has been known a roller chain in which a bush is press-fitted and fixed to an inner plate by projecting by a predetermined amount out of an outer side surface of the inner plate (see Japanese Patent Application Laid-open No. 2008-190547).

However, the roller chain is a seal chain in which graphite lubricant oil sleeve is interposed between the bush and the pin or in which grease is sealed by a seal ring and is not what lubricant oil is supplied to the bearing portion between the bush and the pin from outside.

The gap A between the inner plate 2 and the outer plate 7 is narrow and the prior art standard roller chain 1 requires careful works to accurately supply oil to the narrow gap A in supplying oil by an oilcan or by dripping oil supply. The prior art roller chain 1 also requires a cumbersome work of always supplying an adequate amount of oil because an oil amount of the lubricant oil O that can be held in the gap A is small. Still further, it is presumed that the lubricant oil O supplied to the gap A between the inner plate 2 and the outer plate 7 spreads due to viscosity (surface tension) between the inner plate 2 and the outer plate 7 and is hampered from smoothly infiltrating into the bearing portion 11. As a result, the amount of the lubricant oil supplied to the bearing portion 11 through the gap A is liable to be insufficient. Due to that, wear and damage increases at the bearing portion 11, wear or rust is generated between the pin 9 and the bush 3 which are slidably in contact and a trouble such as chain wear elongation occurs. Still further, if the lubricant oil cannot be accurately supplied or is excessively supplied to the gap A, the lubricant oil scatters to its periphery and causes such troubles as contamination or adhesion to articles being conveyed.

Still further, in a solid lubricant oil-free chain described in Japanese Patent Application Laid-open No. 2008-190547, while a bush projects by a predetermined amount out of an outer side surface of an inner plate and a labyrinth configuration is formed between the inner plate and an outer plate to prevent dust from infiltrating from outside, it is unable to supply lubricant oil to a bearing portion through the gap between the inner plate and the outer plate. Similarly to that, while a bush projects by a predetermined amount out of an inner plate also in a seal chain and a seal ring is interposed between the inner plate and an outer plate so as to surround the project portion, the bush projects to prevent the seal ring from being excessively compressed. Because the seal ring is thus compressed between the inner plate and the outer plate, it is unable to supply lubricant oil to a bearing portion through the gap between the inner plate and the outer plate.

SUMMARY OF THE INVENTION

Accordingly, the present disclosure provides a roller chain arranged such an end surface of a bush abuts with an outer plate to assure a gap between an inner plate and the outer plate by a predetermined amount to solve the abovementioned problems.

According to one aspect of the present disclosure, a roller chain includes an inner link in which both end portions of a pair of inner plates is coupled by a bush and an outer link in which both end portions of a pair of outer plates is linked by a pin and linked with the inner link by inserting the pin into the bush, wherein the bush is projected out of an outer side surface of the inner plate by a predetermined amount and an end surface of the bush being projected is brought into contact with an inner side surface of the outer plate to form a predetermined gap between the outer side surface of the inner plate and the inner side surface of the outer plate, wherein the predetermined gap is within a range of 7 to 18[%] of the distance between the inner side surfaces of the pair of outer plates, and wherein lubricant oil supplied from outside through the predetermined gap is stored around the projection portion of the bush projecting out of the outer side surface of the inner plate to form an oil reservoir and the lubricant oil in the oil reservoir is supplied to a bearing portion between the bush and the pin through the gap between the end surface of the bush and the inner side surface of the outer plate.

Further features of the present invention will become apparent from the following description of exemplary embodiments with reference to the attached drawings.

DESCRIPTION OF THE EMBODIMENTS

Figure 1:
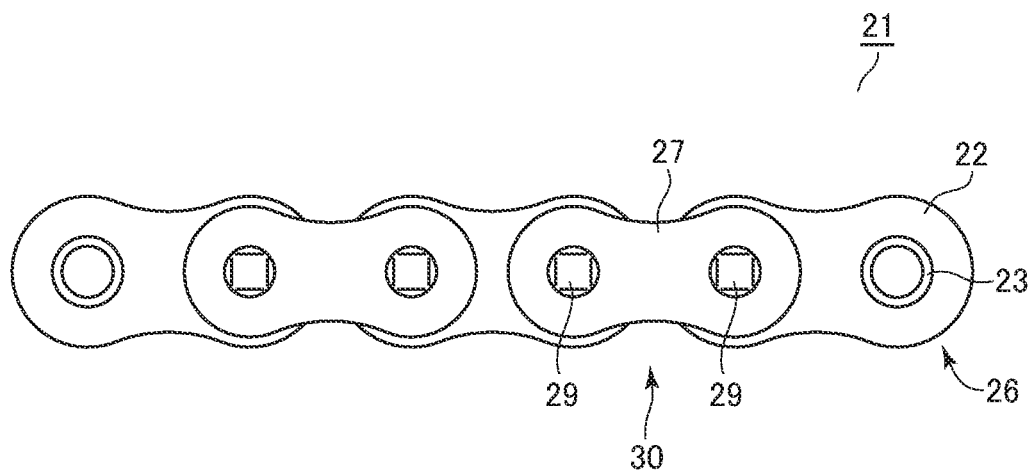
FIG. 1 is a front view illustrating a roller chain according to an embodiment of the present disclosure.
Figure 2:
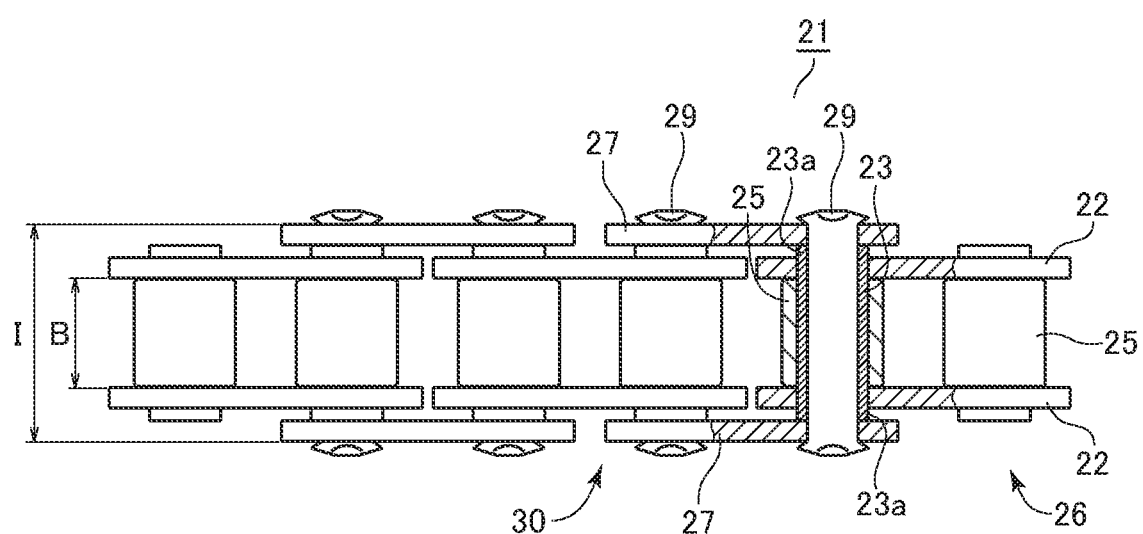
FIG. 2 is a plan view thereof from which a part is sectioned.

Embodiments of the present disclosure will be described below along the drawings. As illustrated in FIGS. 1 and 2, a roller chain 21 is constructed by endlessly linking an inner link 26 in which both end portions of a pair of inner plates 22, 22 are coupled by bushes 23 and 23 and in which a roller 25 is fitted around the bush 23 with an outer link 30 in which both end portions of two outer plates 27, 27 are linked by pins 29, 29 by inserting the pin 29 through the bush 23.

Figure 3:
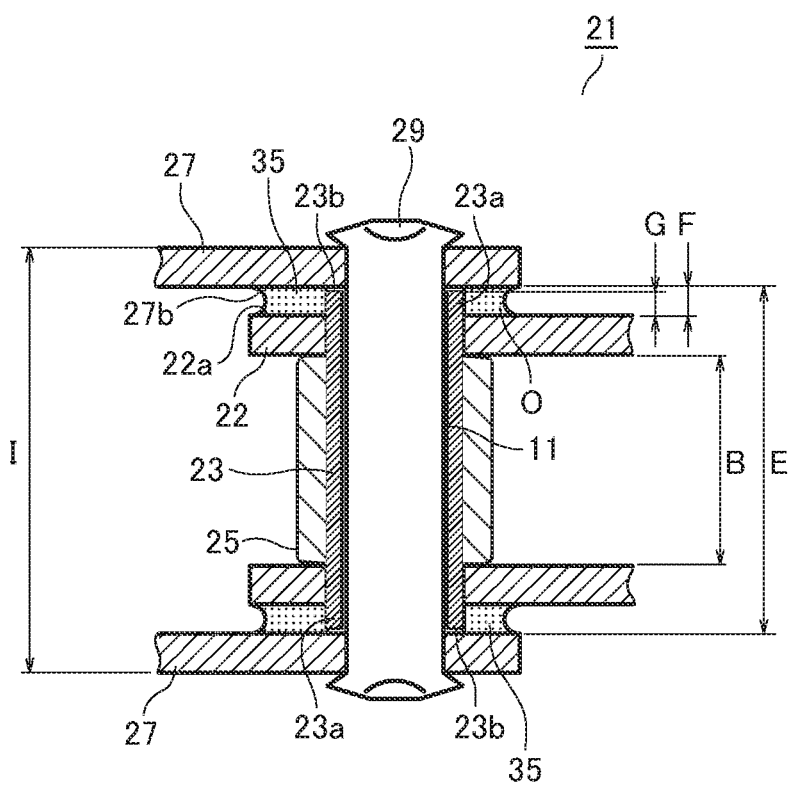
FIG. 3 is an enlarged section view thereof.

As detailed in FIG. 3, the bush 23 is fixed to the inner plate 22 while projecting out of an outer side surface 22a of the inner plate 22 by a predetermined amount. The outer side surface 22a and an inner side surface of the inner plate 22 and an outer side surface and an inner side surface 27b of the outer plate 27 are composed of flat surfaces across a whole surface respectively and are composed of a smooth plate member having a predetermined thickness.

An end surface 23b of right and left project portions 23a, 23a of the bush 23 abut with the inner side surface 27b of the outer plate 27 and defines a relatively wide predetermined gap F between the flat outer side surface 22a of the inner plate 22 and the flat inner side surface 27b of the outer plate 27. That is, the inner plate 22 and the outer plate 27 having the same thickness and the same shape with those of the prior art standard roller chain 1 are used for the roller chain 21 and an inner width B which is a distance between both inner side surfaces of the inner plate 22 is the same with an inner width of the prior art standard roller chain 1. However, an outer width I which is a distance between both outer side surfaces of the outer plate 27 is largely different from that of the prior art standard roller chain.

More specifically, if the distance between the inner side surfaces of the inner plates 22 is denoted as B, the distance between the inner side surfaces of the outer plates 27 is E, a projection amount of the bush 23 out of the outer side surface of the inner plate 22 is G and a predetermined gap between the outer side surface of the inner plate 22 and the inner side surface of the outer plate 27 is F in the roller chain 21, the predetermined gap F described above is 7 to 18[%] of the distance E between the inner side surfaces of the outer plates and is more preferably from 12 to 15[%]. The projection amount G described above is 79 to 91[%] with respect to the predetermined gap F described above and is more preferably from 89 to 91[%].

The roller chain 21 is constructed as described above and travels while being wound around a device such as a sprocket in the same manner with a conventional chain. Even if the roller chain 21 has the relatively wide predetermined gap F between the inner link 26 and the outer link 30, the inner link 26 and the outer link 30 will not be rattled largely in a width direction because the end surface 23b of the project portion 23a of the bush is in contact with the inner side surface 27b of the outer plate 27.

The lubricant oil O is supplied from the relatively wide predetermined gap F by drip oil supply while traveling the roller chain 21 or by an oilcan before traveling the roller chain 21. At this time, the lubricant oil O can be supplied readily and steadily without spilling the lubricant oil to its periphery by adjusting a dripping nozzle or an oil supply port of the oilcan to the predetermined gap F described above. The lubricant oil O supplied to the gap F is held in the predetermined gap F between the planar outer side surface 22a of the inner plate 22 and the inner side surface 27b of the outer plate 27 by viscosity (surface tension). That is, the lubricant oil O supplied from the outside is held in the wide predetermined gap F (=0.07 to 0.18E) by the viscosity between the both plates or by viscosity with the project portion 23a in particular, and an enough amount is assured by becoming as an oil reservoir 35. The lubricant oil O stored in the oil reservoir 35 around the project portion 23a is led to a gap (F–G) between the end surface 23b and the inner side surface 27b of the outer plate 27 by capillarity and to the bearing portion 11 through a gap between the end surface 23b of the bush 23 and the inner side surface 27b of the outer plate 27 by an action of a pump caused by a relative move (vibration) in an axial direction of the bush 23 with respect to the pin 29 and by flexion of the inner link 26 and the outer link 30, so that the pin 29 is smoothly and slidably in contact with the bush 23 in a fully lubricated state. Thereby, it is possible to travel the roller chain 21 in a state in which the enough lubricant oil is assured in the bearing portion 11, to prevent quick fatigue or rust from being generated otherwise by insufficient lubricant and to keep high-precision traveling for a long period of time.

In a case where the roller chain 21 is used for conveyance of articles such as cans in particular, a drip amount for which the drip oil supply or forced pump lubrication is applied to set a lot of lubricant oil, and the lot of lubricant oil dripped through the relatively wide gap F is led to the bearing portion 11 while being held by the gap F. Then, it becomes possible to enhance a conveyance performance of the roller chain 21 by increasing a conveyance speed of the roller chain 21 based on the enough amount of the lubricant oil O. Still further, because the lot of lubricant oil O can be held in the predetermined gap F, it is possible to reduce such troubles otherwise caused by the lot of lubricant oil supplied by the drip oil supply or the like scattering around to its periphery, contaminating the device or adhering to the articles, requiring a cumbersome post-processing.

If the predetermined gap F is smaller than 7[%] of the distance E between the inner side surfaces of the outer plates, it becomes unable to sufficiently supply the lubricant oil O readily and steadily to the predetermined gap F and unable to assure the lubricant oil by the oil reservoir 35. If the predetermined gap F is greater than 18[%], it becomes unable to sufficiently held the lubricant oil by the viscosity (surface tension) between the outer side surface 22a of the inner plate and the inner side surface 27b of the outer plate and is liable to cause scattering of the lubricant oil. Still further, if the project amount G of the project portion 23a is smaller than 79[%] of the predetermined gap F, there is a possibility that rattling of the chain in the width direction increases, thus inviting troubles in smooth conveyance and drive of the roller chain. If it is more than 91[%], the gap between the bush end surface 23b and the inner side surface 27b of the outer plate is reduced and the lubricant oil cannot be fully fed to the bearing portion 11 from the oil reservoir 35 around the bush through the predetermined gap F.

The bearing portion 11 between the bush 23 and the pin 29 is prolonged in the axial direction by the projection of the bush 23 by the predetermined project amount G from the outer side surface 22a of the inner plate described above. Thereby, lubrication of the roller chain described above is assured in a wide area by the enough lubricant oil described above. That is, because the bush project amount is 79 to 91[%] of the predetermined distance described above, together with that the predetermined distance is 7 to 18[%] of the width between the plates of the outer link, the lot of lubricant oil can be held in the oil reservoir around the bush project portion, and the lubricant oil can be supplied to the bearing portion and can be circulated by the capillary due to the narrow gap between the end surface of the bush and the inner side surface of the outer link plate and by the pumping action caused by the bush vibrating in the longitudinal direction. Still further, the lubrication of the bearing portion described above can be assured and the vibration in a predetermined amount of the pin longitudinal direction can be kept by prolonging the length of the bearing portion of the bush and the pin with respect to an engage width with a sprocket defined based on the distance of the inner side surfaces of the inner link plates.

Figure 4:
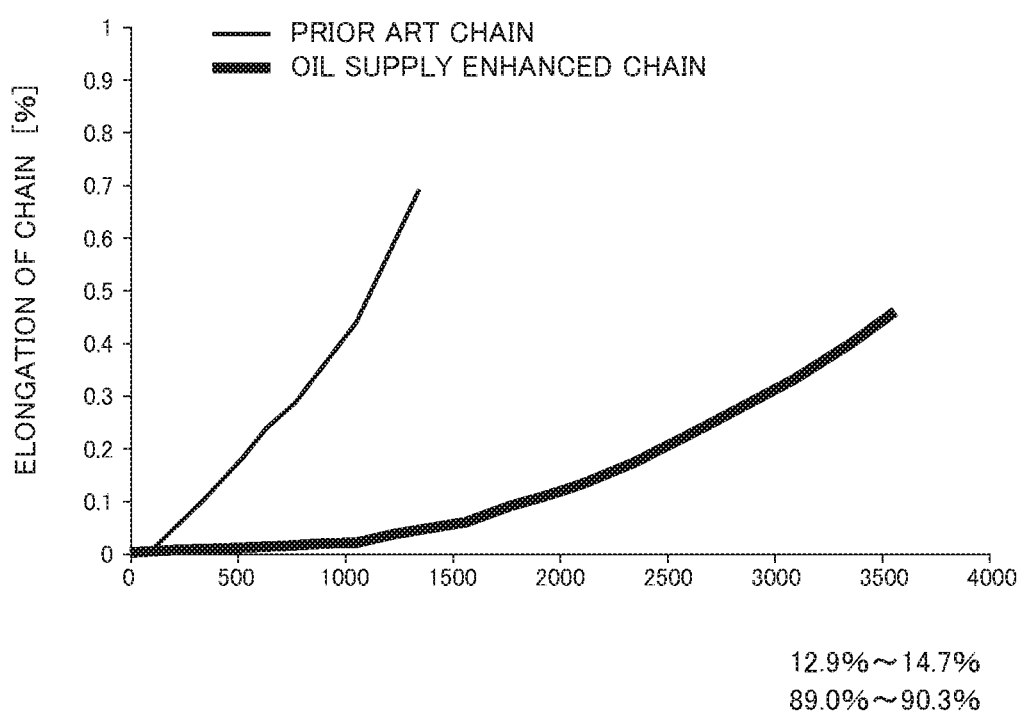
FIG. 4 is a graph comparing wear elongation performances of a prior art chain and a chain of the present disclosure.

FIG. 4 is a graph in which wear elongation of the prior art standard roller chain (thin line) is compared with that of the roller chain (thick line) of the present disclosure. Conditions of the comparison test were: oil supply amount; 72 cm$^2$, oil supply interval; 2 hours 30 minutes, atmospheric temperature; 210° C., number of rotations; 460 rpm, and tension; 150 kgf. The roller chain of the present disclosure has about three times of wear elongation performance as compared to the prior art roller chain.

Figure 5:
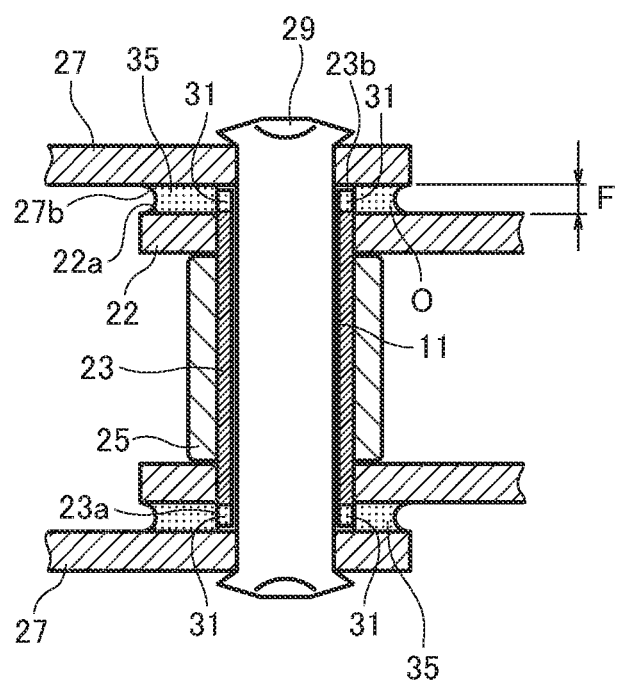
FIG. 5 is a section view thereof partly modified.
Figure 6:
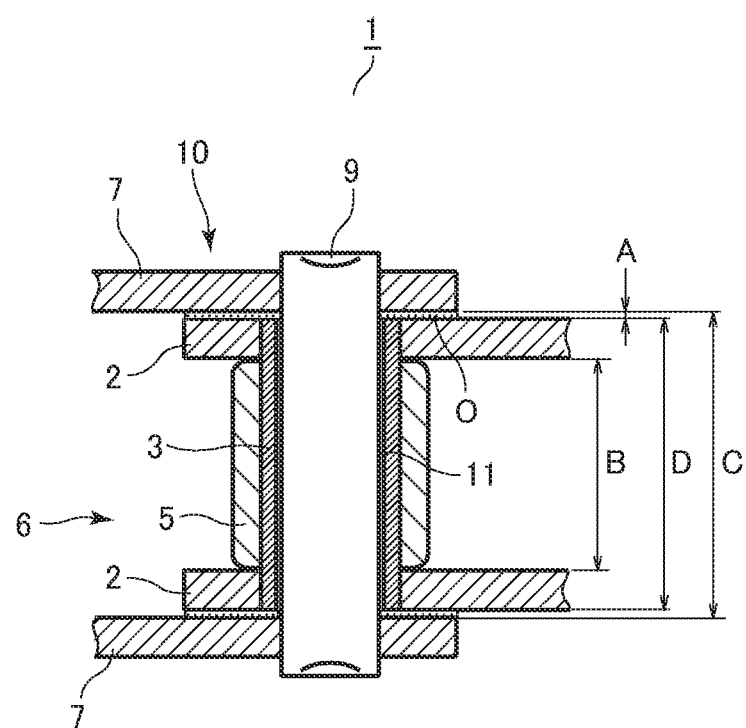
FIG. 6 is an enlarged section view illustrating a prior art roller chain.

Because the end surface 23b of the bush 23 abuts with or comes closer to the inner side surface 27b of the outer plate 27 by its whole circumference surface, there is a possibility that an amount of the lubricant oil led to the bearing portion 11 through the gap is limited. An embodiment by which such limitation is eliminated will be described along FIG. 5. Note that the same component parts with those of the embodiment illustrated in FIG. 3 will be denoted by the same reference signs and their description will be omitted. A predetermined number of grooves 31 having a predetermined depth is formed on the project portion 23a of the bush 23 toward inside in the width direction from the end surface 23b. The end surface 23b of the bush 23 is in contact with the inner side surface 27b of the outer plate 27 at part other than the grooves 31, so that the predetermined gap F is kept. The lubricant oil O held in the gap F is led to the bearing portion 11 through the groove 31 besides the gap between the end surface 23b and the inner side surface 27b described above. Thereby, a relatively lot of lubricant oil is led smoothly and steadily to the bearing portion 11, and an amount of lubricant oil corresponding to an increase of a speed of the roller chain 21 described above can be steadily and accurately supplied to the bearing portion 11.

The number of the grooves 31 formed on the project portion 23a, a width of the groove and a shape of the grove are appropriately set by considering the viscosity of the lubricant oil with the project portion 23a, i.e., holding power of the oil reservoir around the bush project portion based on the predetermined gap F, and an amount of lubricant oil required for the bearing portion 11. Still further, the groove 31 may be formed aslant with respect to the width direction to assure an amount of lubricant oil to be supplied. A through hole may be formed through the project portion 23a, instead of the grooves. In short, a communicate portion communicating an inner circumferential surface with an outer circumferential surface of the bush project portion needs to be formed, and the lubricant oil is led to the bearing portion 11 through the predetermined gap F by passing through the communicate portion (31).

Because the bush project portion is formed, the end surface of the bush can steadily lead the lubricant oil supplied to the predetermined gap to the bearing portion by passing through the communicate portion even though the bush end surface assures the predetermined gap by abutting with the inner side surface of the outer plate. This arrangement makes it possible to supply an enough amount of lubricant oil to the bearing portion by increasing the amount of supplied lubricant oil by the dripping oil supply for example, to increase a traveling speed of the roller chain and to enhance article conveyance ability by applying it to the conveyance roller chain. Still further, because the communicate portion is a groove, it can be formed readily and an amount of lubricant oil supplied to the bearing portion can be set simply by adjusting the number of grooves, the width of the groove and the like.

According to one aspect of the present disclosure, because the bush is projected out of the outer side surface of the inner plate and the end surface of the projecting bush abuts with the inner side surface of the outer plate to assure the gap between the inner plate and the outer plate by the predetermined amount, it is possible to readily and steadily supply the lubricant oil toward the predetermined gap, to assure an amount of lubricant oil that can be held in the predetermined gap and to readily and steadily supply the lubricant oil to the bearing portion by the simple structure. It is also possible to reduce contamination of its periphery otherwise caused by scattered lubricant oil and adhesion to the conveyed articles. The lubricant oil supplied from outside is held as an oil reservoir around the bush project portion by viscosity with the bush project portion. Because the predetermined gap forming the oil reservoir is a wide distance of 7 to 18[%] of the distance between the inner side surfaces of the outer plates, a lot of lubricant oil is held in the oil reservoir and the lot of lubricant oil held in the oil reservoir is steadily led to the bearing portion by capillary due to the narrow gap between the end surface of the bush and the inner side surfaces of the outer link plates. Thereby, the bearing portion is lubricated by the enough amount of lubricant oil. Still further, the lubricant oil in the bearing portion is appropriately circulated with the lot of lubricant oil held in the oil reservoir by the flexion of the chain and by vibration in a longitudinal direction of the bush with respect to the pin, thus reducing wear and damages of the bearing portion and suppressing quick wear of the chain and rust otherwise from being caused by the insufficient lubrication. Still further, because the lot of lubricant oil can be held in the oil reservoir, it becomes possible to prolong oil supplying intervals and to facilitate and to simplify its management. Still further, the lubricant oil in the oil reservoir is held by the viscosity between the inner plate and the outer plate together with the viscosity with the bush project portion. Accordingly, it is possible to enhance transmission and conveyance efficiencies with the simple structure without requiring other members and a special arrangement like a seal ring and without causing wear and damages by the seal ring and others.

Note that while the abovementioned embodiment has been described by applying it to a single-row roller chain, the present disclosure is not limited to that and is also applicable to a plural-row roller chain such as a double-row roller chain in which a plurality of single-row roller chains is arrayed in the width direction. In this case, an inside of an outer plate is an intermediate plate.

INDUSTRIAL APPLICABILITY

The roller chain can be used as a roller chain for conveyance or power transmission and is suitably used as a seal-less roller chain in particular.

The present disclosure is not limited to the embodiments described above and may be modified or deformed variously without departing from a spirit and a scope of the present disclosure. Accordingly, the following claims will be attached to make the scope of the present disclosure public.

While the present invention has been described with reference to exemplar embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A roller chain comprising:
   an inner link in which both end portions of a pair of inner plates are coupled by a bush; and
   an outer link in which both end portions of a pair of outer plates are linked by a pin and which is linked with the inner link by inserting the pin into the bush,
   wherein the bush is projected out of an outer side surface of the inner plate by a predetermined amount and an end surface of the bush being projected is brought into contact with an inner side surface of the outer plate to form a predetermined gap between the outer side surface of the inner plate and the inner side surface of the outer plate,
   wherein the predetermined gap is within a range of 7 to 18[%] of a distance between inner side surfaces of the pair of outer plates, and
   wherein lubricant oil supplied from outside through the predetermined gap is stored around the project portion of the bush projecting out of the outer side surface of the inner plate to form an oil reservoir and the lubricant oil in the oil reservoir is supplied to a bearing portion between the bush and the pin through a gap between an end surface of the bush and the inner side surface of the outer plate.

2. The roller chain according to claim 1 wherein a length of the project portion of the bush is within a range of 79 to 91[%] of the predetermined gap.

3. The roller chain according to claim 1 wherein the project portion of the bush forms a communicate portion communicating an inner circumferential surface with an outer circumferential surface of the bush.

4. The roller chain according to claim 3 wherein the communicate portion is a groove of a predetermined depth formed from the end surface of the bush.

* * * * *